United States Patent
Shrivastava et al.

(10) Patent No.: US 11,252,536 B2
(45) Date of Patent: Feb. 15, 2022

(54) METHOD AND SYSTEM FOR PROVIDING CONTINUED MULTIMEDIA BROADCAST MULTICAST SERVICE (MBMS) AND UNICAST SERVICES

(71) Applicant: SAMSUNG ELECTRONICS CO., LTD., Suwon-si (KR)

(72) Inventors: Vinay Kumar Shrivastava, Bangalore (IN); Ankit Srivastav, Bangalore (IN); Rohan Raj, Bangalore (IN); Ramanagouda Odugoudar, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 16/708,544

(22) Filed: Dec. 10, 2019

(65) Prior Publication Data

US 2021/0105585 A1 Apr. 8, 2021

(30) Foreign Application Priority Data

Oct. 7, 2019 (IN) .............................. 201941040529

(51) Int. Cl.
*H04W 4/06* (2009.01)
*H04W 72/00* (2009.01)
(Continued)

(52) U.S. Cl.
CPC ............. *H04W 4/06* (2013.01); *H04L 5/005* (2013.01); *H04W 48/12* (2013.01); *H04W 48/16* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS 7,890,110 B2   2/2011  Moon et al.
8,625,516 B2 * 1/2014  Lindoff ................ H04W 28/04
                                              370/329
(Continued)

FOREIGN PATENT DOCUMENTS

WO       2013/191985        12/2013
WO    WO 2013/191985 A1 * 12/2013 ............ H04W 36/00

*Primary Examiner* — Peter G Solinsky
*Assistant Examiner* — Sanjay K Dewan
(74) *Attorney, Agent, or Firm* — F. Chau & Associates, LLC

(57) ABSTRACT

The present disclosure discloses systems and methods for providing continuous Multimedia Broadcast Multicast Service (MBMS) and unicast services during mobility. On detecting mobility from a first cell to a second cell, the User Equipment (UE) receives system information and a preamble transmission signal. A System Information (SI) time window is determined from the system information and a Random-Access Response (RAR) window is determined using the preamble transmission signal. The UE performs either an SI-Radio Network Temporary Identifier (SI-RNTI) decode on System Information Block Type 2 (SIB2) during the SI time window or a Random Access (RA)-RNTI decode during the RAR window. Subsequently, the UE decodes MBMS-RNTI (M-RNTI) before and after the selected window based on an MBMS configuration received from the first cell. Thereafter, the UE receives a Multimedia Broadcast Single Frequency Network (MBSFN) configuration for the second cell, which is enables uninterrupted MBMS and unicast services.

20 Claims, 6 Drawing Sheets

(51) Int. Cl.
  *H04W 74/08* (2009.01)
  *H04W 48/12* (2009.01)
  *H04W 48/16* (2009.01)
  *H04L 5/00* (2006.01)

(52) U.S. Cl.
  CPC ..... *H04W 72/005* (2013.01); *H04W 74/0833* (2013.01)

(58) Field of Classification Search
  USPC .......................................................... 370/329
  See application file for complete search history.

(56) References Cited

U.S. PATENT DOCUMENTS

| | | | | |
|---|---|---|---|---|
| 9,226,288 | B2* | 12/2015 | Barbieri | H04W 72/0426 |
| 10,206,132 | B2* | 2/2019 | Park | H04W 72/0446 |
| 2011/0305183 | A1 | 12/2011 | Hsu et al. | |
| 2011/0305184 | A1 | 12/2011 | Hsu | |
| 2013/0336296 | A1* | 12/2013 | Dinan | H04W 76/27 |
| | | | | 370/336 |
| 2013/0343297 | A1* | 12/2013 | Dinan | H04W 36/0072 |
| | | | | 370/329 |
| 2014/0086173 | A1* | 3/2014 | Sadeghi | H04L 5/003 |
| | | | | 370/329 |
| 2014/0092830 | A1* | 4/2014 | Chen | H04W 72/042 |
| | | | | 370/329 |
| 2014/0161020 | A1 | 6/2014 | Jung et al. | |
| 2015/0223087 | A1* | 8/2015 | Yu | H04L 5/001 |
| | | | | 455/418 |
| 2016/0094955 | A1 | 3/2016 | Shrivastava et al. | |
| 2016/0127098 | A1* | 5/2016 | Ng | H04L 5/0048 |
| | | | | 370/329 |
| 2016/0249266 | A1* | 8/2016 | Kim | H04W 36/0007 |
| 2016/0353308 | A1* | 12/2016 | Kim | H04W 4/06 |
| 2017/0111886 | A1* | 4/2017 | Kim | H04W 48/14 |
| 2017/0180952 | A1* | 6/2017 | Kim | H04W 72/121 |
| 2017/0207924 | A1* | 7/2017 | Lee | H04W 72/005 |
| 2017/0366947 | A1 | 12/2017 | Makhija et al. | |
| 2018/0124574 | A1* | 5/2018 | Byun | H04W 92/20 |
| 2018/0206289 | A1* | 7/2018 | Kim | H04W 72/12 |

* cited by examiner

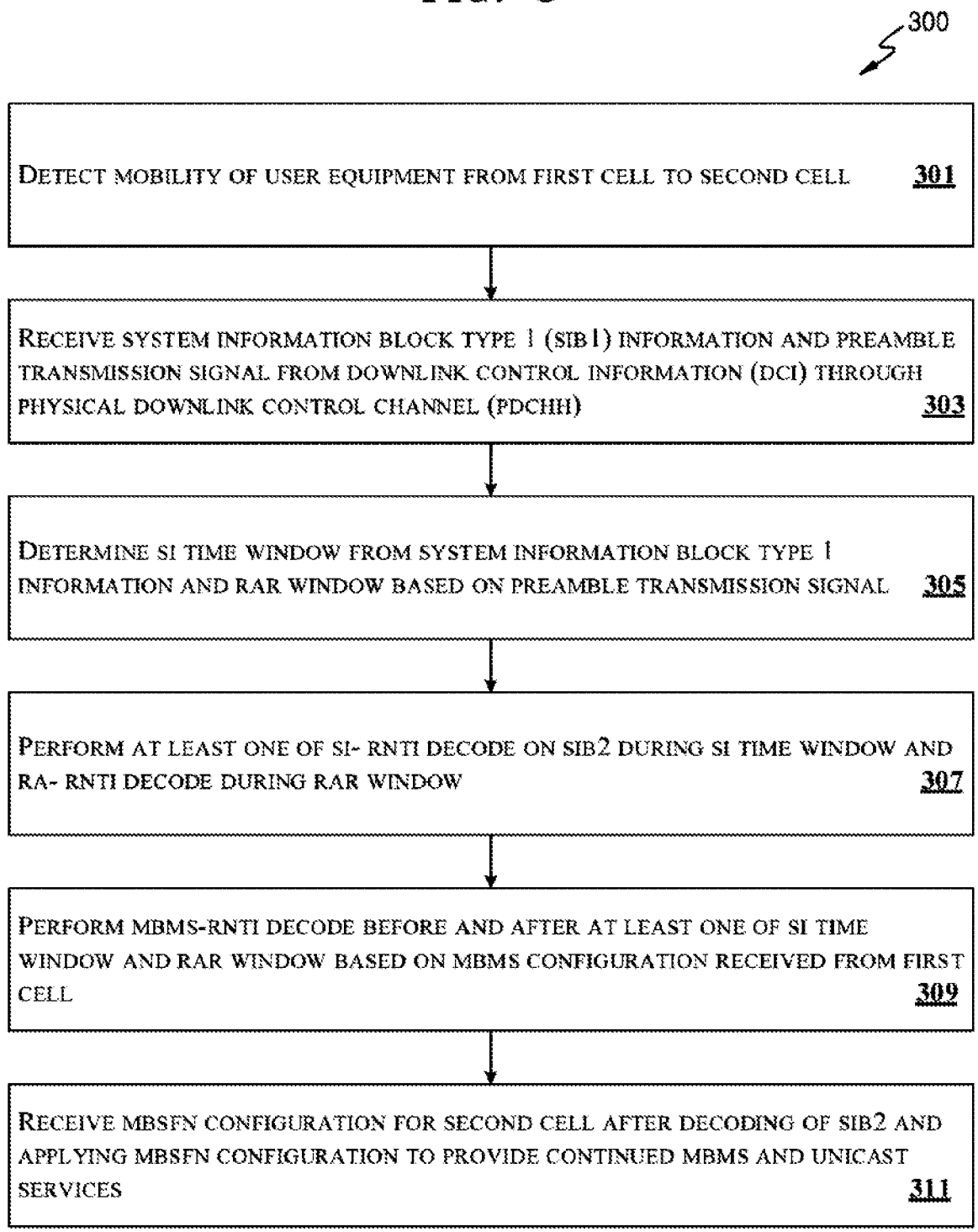

METHOD AND SYSTEM FOR PROVIDING CONTINUED MULTIMEDIA BROADCAST MULTICAST SERVICE (MBMS) AND UNICAST SERVICES

CROSS REFERENCE

This application claims priority to, and the benefit of, Indian Application Serial No. 201941040529 filed on Oct. 7, 2019. The entire contents of the foregoing application are hereby incorporated by reference for all purposes.

TECHNICAL FIELD

The present subject matter is related in general to a wireless communication system. More particularly, but not exclusively, the subject matter is related to a method and system for providing continued Multimedia Broadcast Multicast Service (MBMS) and unicast services across MBMS and non-MBMS coverage regions.

BACKGROUND

Over the years, communications technology has evolved significantly by relying heavily on wireless communications. More recently, Multimedia Broadcast Multicast Service (MBMS) has attracted a great attention in telecommunication industry. Typically, MBMS is a point-to-multipoint interface specification which is designed to provide efficient delivery of broadcast and multicast services, both within a cell and within a core network. Maintaining service reception for moving users in a high mobility environment has become a crucial task for service providers.

A Multimedia Broadcast Single Frequency Network (MBSFN) may be used for providing content to users of a telecommunication network (for example, a network which uses Long Term Evolution (LTE), LTE Advanced or any other LTE based technology) for providing data to a User Equipment (UE) connected to the network. The data can relate to television content or other broadcast media content. Communication standards define the use of two logical channels for use by MBSFN—a Multicast Control Channel (MCCH) and a Multicast Traffic Channel (MTCH). MCCH is used to transfer control information. MCCH may carry a single message, the MBSFNAreaConfiguration message, which indicates which Multimedia Broadcast Multicast Service (MBMS) sessions that are ongoing, as well as the corresponding radio resource configuration.

MTCH is used to transfer MBMS data packets. User services, including streaming and application downloading services, may also be mapped onto the MTCH. Both MCCH and MTCH can be mapped to a single transport channel meant for multicast/broadcast traffic—the Multicast Channel (MCH). MCH is further mapped to an MBSFN specific physical channel termed a Physical Multicast Channel (PMCH). Typically, during mobility to a new cell, user devices receive a System Information Block Type 1 (SIB) and a preamble transmission via Downlink Control Information (DCI) through the Physical Downlink Control Channel (PDCHH). The SIB1 carries cell access related information.

MBMS service may be configured to support an MBSFN transmission mode during transmissions across multiple cells. Conventionally, when a user device moves to a different MBSFN area, or to non-MBMS coverage area, the source base station may execute the handover of information for the device. In this case, the source base station may select a cell having a better signal quality and handover the user device to the selected cell. However, such a handover procedure may result in interruption of the MBMS service to the user device. Such an interruption may lead to poor user experiences such as buffering, stalling, video freezing, call mute, call drop and the like.

Sub-frames which can be used for broadcast/multicast purposes are termed MBSFN sub-frames. Information about these sub-frames and the associated radio frames are transmitted using a System Information Block Type 2 (SIB2) message, "MBSFN-sub-frameConfigList." For example, sub-frames 1, 2, 3, 6, 7 and 8 can be used for an MBSFN reception in networks using Frequency Division Duplexing (FDD). For networks using Time Division Duplexing (TDD), sub-frames 3, 4, 7, 8 and 9 can be used for an MBSFN reception.

In some cases, a UE can utilize additional information to identify the presence of MCCH, as well as to identify the configurations used to acquire MCCH. This information is provided to the UE in a separate system information block dedicated for MBMS (e.g. SIB-13), which carries information about all the MBSFN areas configured under a radio cell to which the UE is connected. On request from a higher layer, a Radio Resource Control (RRC) layer acquires a SIB-13 and checks if the information is present (i.e., information related to an area of an MBSFN in which the UE is interested). If the information is present, the UE can further attempt to acquire MCCH information for that MBSFN area.

In some cases, UEs may have the ability to support both unicast and MBSFN services efficiently and independently of each other. However, during mobility it is still difficult to provide unicast services without affecting MBSFN services and vice versa.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for providing continued Multimedia Broadcast Multicast Service (MBMS) and unicast services across MBMS and non-MBMS regions. The method includes detecting mobility of a User Equipment (UE) from a first cell to a second cell. A System Information Block Type 1 (SIB1) information and a preamble transmission signal is received from a Downlink Control Information (DCI) through a Physical Downlink Control Channel (PDCHH), on detecting the mobility to the second cell. Furthermore, the method includes determining a System Information (SI) time window from the SIB1 information and a Random-Access Response (RAR) window based on the preamble transmission signal associated with the UE. Furthermore, the method includes performing one of, SI-Radio Network Temporary Identifier (SI-RNTI) decode on a System Information Block Type 2 (SIB2) during the SI time window and a Random Access (RA-RNTI) decode in RAR window.

Subsequently, the method involves performing an MBMS-RNTI (M-RNTI) decode before and after at least one of the SI time windows and RAR window based on MBMS configuration received from the first cell. Thereafter, the method includes receiving Multimedia Broadcast Single Frequency Network (MBSFN) configuration for the second cell after decoding of the SIB2. The MBSFN configuration of the second cell is applied to provide continued Multimedia Broadcast Multicast Service (MBMS) and unicast services.

In an embodiment, the present disclosure may relate to a UE for providing continued MBMS and unicast services across MBMS and non-MBMS coverage regions. The UE may include a processor and a memory communicatively coupled to the processor, where the memory stores processor executable instructions, which, on execution, may cause to detect mobility of a UE from a first cell to a second cell. SIB1 information and a preamble transmission signal is received from a DCI through a PDCHH, on detecting the mobility to the second cell. The UE determines a System Information (SI time window from the SIB information and RAR window based on the preamble transmission signal associated with the UE. Furthermore, the UE performs one of, SI-RNTI decode on SIB2 during the SI time window and RA-RNTI decode during the RAR window. Subsequently, the UE performs a M-RNTI decode on SIB2 before and after at least one of the SI time windows and RAR window based on MBMS configuration received from the first cell. Thereafter, the UE receives MBSFN configuration for the second cell after decoding of the SIB2. The MBSFN configuration of the second cell is applied to provide continued MBMS and unicast services.

In an embodiment, a UE may detect mobility from a first cell to a second cell; receive system information based on detecting the mobility; determine a time window based on the system information; perform an RNTI decode during the time window; perform an MBMS decode before and after the time window based on an MBMS configuration received from the first cell; and receive an MBSFN configuration for the second cell based on the RNTI decode and the MBMS configuration.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 3 illustrates a flowchart showing a method for providing continued Multimedia Broadcast Multicast Service (MBMS) and unicast services across MBMS and non-MBMS regions in accordance with some embodiments of present disclosure.

Figure 1A:
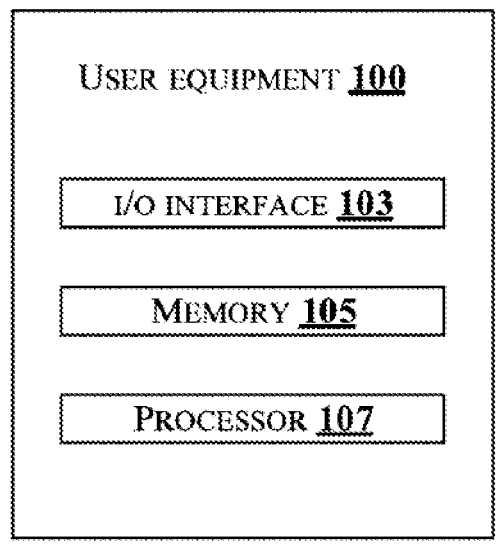
FIG. 1A illustrates an exemplary block diagram of a User Equipment (UE) in accordance with some embodiments of the present disclosure.

It should be appreciated by those skilled in the art, that any block diagrams herein represent conceptual views of illustrative systems embodying the principles of the present subject matter. Similarly, it will be appreciated that any flow charts, flow diagrams, state transition diagrams, pseudo code, and the like represent various exaggerated processes which may be more effectively represented in computer readable medium and executed by a computer or processor, whether or not a computer or processor is explicitly shown.

DETAILED DESCRIPTION

Embodiments of the present disclosure relate to improved cellular services while moving across service areas.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way examples in the drawings and will be described in detail below. It should be understood that drawings and detailed descriptions are not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover non-exclusive inclusions, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail, which should enable those skilled in the art to practice the disclosure, and it is to be understood that other embodiments may be utilized and that changes may be made without departing from the scope of the present disclosure. The following description is, therefore, not to be taken in any limiting sense.

Embodiments of the present disclosure relates to a method and a User Equipment (UE) for providing continued Multimedia Broadcast Multicast Service (MBMS) and unicast services across MBMS and non-MBMS regions. In an embodiment, the MBMS may refer to a point-to-multipoint interface specification is designed to provide efficient delivery of broadcast and multicast services to users both within a cell as well as within a core network.

Generally, when the UE receives any MBMS service, for example streaming audio, streaming video, television channels, file download etc., there may be a possibility for the UE to move across an MBMS service region, to a different region, or to a non-MBMS region. Typically, a handover technique is implemented on the UE based on signal quality at different cells, where signal quality is detected by the UE itself. Thus, a handover technique may help in restoring the service to the UE by altering the cell used.

However, such techniques are, at times, not effective enough to maintain service and have resulted in interruption of the MBMS service to the UE. The present disclosure may detect mobility of the UE from a first cell to a second cell, reducing the chance of service interruption. Upon detection of mobility from the first cell to the second cell, the UE receives System Information Block Type 1 (SIB1) information and a preamble transmission signal from a Downlink Control Information (DCI). In an embodiment, the preamble transmission signal may be a signal used in network communications to synchronize transmission timing between two or more devices. A System Information (SI) time window and a Random-Access Response (RAR) window for the UE are determined based on the SIB1 information and the preamble transmission. During the SI time window, the UE decodes a SI-Radio Network Temporary Identifier (SI-RNTI) and/or during the RAR window, the UE decodes a Random Access (RA-RNTI). Likewise, before and after at least one of the SI time windows and RAR window, the UE decodes a MBMS-RNTI (M-RNTI) on a System Information Block Type 2 (SIB2) based on MBMS configuration received from the first cell. Thereafter, a Multimedia Broadcast Single Frequency Network (MBSFN) configuration for the second cell is received and applied on the UE to provide continued Multimedia Broadcast Multicast Service (MBMS) and unicast services. The present disclosure provides a seamless user experience by eliminating service interruption upon mobility between cells.

FIG. 1A illustrates an exemplary block diagram of a User Equipment (UE) in accordance with some embodiments of the present disclosure. Specifically, FIG. 1A illustrates a UE 100. The UE 100 includes an Input/Output (I/O) interface 103, a processor 107 and a memory 105 for storing instructions executable by the processor 107. The I/O interface 103 is coupled with the processor 107 through which an input signal and/or an output signal is communicated. The UE 100 may be used by a user for receiving Multimedia Broadcast Multicast Service (MBMS) and unicast services. In an embodiment, the MBMS may refer to a point-to-multipoint service provided by $3^{rd}$ Generation Partnership Project (3GPP) systems to provide user data from a single network entity to multiple UEs.

In an embodiment, various types of services may be provided as MBMS services. For example, TV broadcasting, message distribution, audio streaming, and the like can be considered MBMS services. In an embodiment, the UE 100 may be any computing device associated with users. For example, a laptop, a desktop computer, a Personal Digital Assistant (PDA), a notebook, a smartphone, wearable devices, television, sensors, IOT device, connected vehicle, a tablet and any other computing devices can be used as the UE 100. A person skilled in the art would understand that the scope of the present disclosure may encompass any other UE 100, where service is being provided by an MBMS service and unicast service, not mentioned herein explicitly. In an embodiment, the UE 100 may be present in either a MBMS region which supports MBMS service or a non-MBMS region. The UE 100 may be used for providing continued MBMS and unicast services to users across MBMS and non-MBMS regions. A person skilled in the art would understand that FIG. 1A is an exemplary embodiment and the UE 100 may include any other units, not mentioned explicitly in the present disclosure.

Figure 1B:
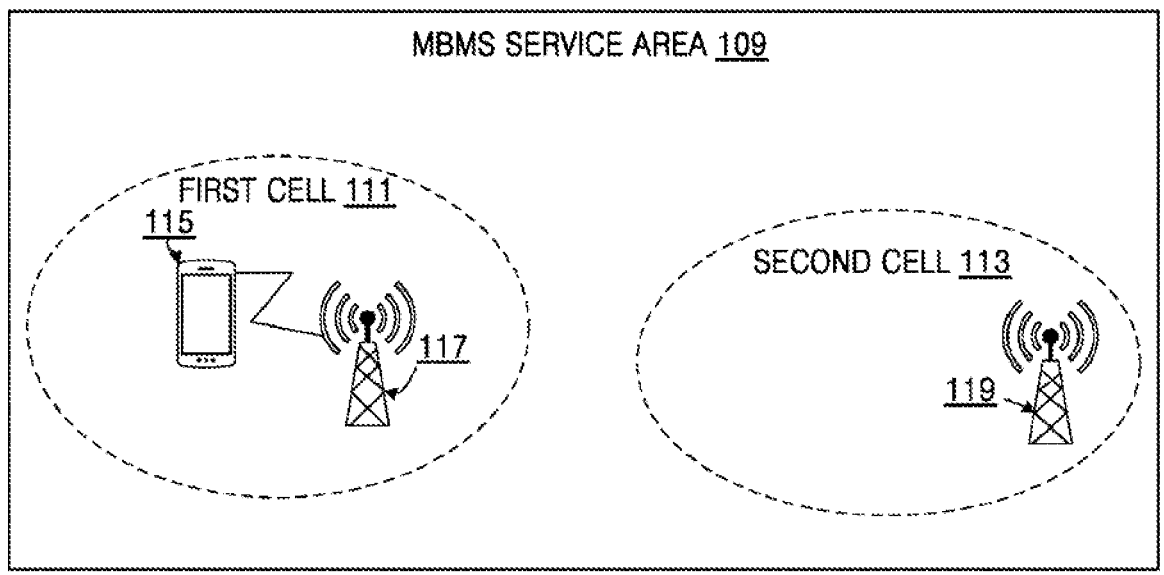
FIG. 1B illustrates an exemplary representation of a UE in an MBMS service area, represented by the accompanied cell regions, in accordance with some embodiments of the present disclosure.

FIG. 1B illustrates an exemplary embodiment for providing continued Multimedia Broadcast Multicast Service (MBMS) and unicast services across MBMS and non-MBMS regions. The exemplary embodiment includes an MBMS service area 109 which supports the MBMS services, where the MBMS service area 109 includes a first cell 111 and a second cell 113. In an embodiment, a cell is defined as a geographic area covered by a base station in a cellular network. A person skilled in the art would understand that the FIG. 1B is an exemplary embodiment and the MBMS service area 109 may include a plurality of cells. The first cell 111 is covered by a base station 117 and the second cell 113 is covered by a base station 118. At an instance of time, the UE 100, mobile phone 115, is associated with a user which may be present in the first cell 111 and is receiving MBMS services, such as audio streaming, through the base station 117 based on a Multicast Broadcast Single Frequency Network (MBSFN) service configuration information of the first cell 111. For instance, consider that the user of the mobile phone 115 moves from the first cell 111 towards the second cell 113. Additionally, the UE 100, (i.e., the mobile phone 115) may detect the mobility from the first cell 111 to the second cell 113. On detecting the mobility from the first cell 111, the mobile phone 115 may receive SIB1 information and a preamble transmission signal from a Downlink Control Information (DCI) through a Physical Downlink Control Channel (PDCHH). Furthermore, the mobile phone 115 may determine an SI time window from the SIB information and the preamble transmission signal. In an embodiment, the SI time window may be a specific time domain of configurable length. In an embodiment, the SIB1 may contain relevant information if the UE 100 is permitted to access a cell.

Additionally, the SIB1 may contain necessary information related to cell access. For example, tracking area code, cell identity, information for cell selection, scheduling information, SI-window length, and the like are considered necessary information related to cell access. Additionally, the mobile phone 115 may determine the Random-Access Response (RAR) window based on the preamble transmission signal associated with the mobile phone 115. Furthermore, the mobile phone 115 may perform a Radio Network Temporary Identifier (RNTI) decode on SIB2 during the SI time window and RA-RNTI during the RAR window. In an embodiment, the RNTI may be used for identifying a connected IE in a cell. Specifically, the SI-RNTI may be allocated to any UE for broadcasting of SI. The RA-RNTI may be used during random access procedure. Particularly, RAR is generated as a response to the random-access preamble transmitted by the UE 100. In an embodiment, the mobile phone 115 may estimate a channel based on a Cell-specific Reference Signal (CRS) while performing the SI-RNTI decode during the SI time window and the RA-RNTI during the RAR window. In an embodiment, the SIB2 may contain radio resource configuration information that is common among different UEs 100. The SIB2 may carry common and shared channel configuration and MBSFN sub-frame configuration comprising time occurrence information of MBSFN candidate sub-frames.

Additionally, the mobile phone 115 may perform an M-RNTI decode before and after the SI time window based on MBMS configuration received from the first cell 111. In an embodiment, the mobile phone 115 may estimate a channel based on the MBSFN Reference Signal (MRS) on all MBSFN candidate sub-frames. In an embodiment, the M-RNTI decode and the channel estimation based on the MRS may be initiated immediately after SIB or RAR is successfully decoded, even before the end of the respective time window. In an embodiment, the M-RNTI may be used to inform the UE 100 in RRC_IDLE mode and in RRC_CONNECTED mode about an MCCH information change. In an embodiment, the mobile phone 115 may perform a blind decode by performing an MBSFN decode on all MBMS candidate sub-frames by applying the channel estimated based on the MRS and M-RNTI based decode.

In an embodiment, the mobile phone 115 may perform a parallel decode of SIB2/RAR and MBSFN on one or more carriers in the SI time window and the RAR window by reception of SI-RNTI OR RA-RNTI and M-RNTI simultaneously on the same carrier and also by reception of SI-RNTI OR RA-RNTI and M-RNTI simultaneously on different carriers. In an embodiment, the carrier may be implemented by one or more Radio frequency (RF) paths which may belong to the same or different base stations.

In an embodiment, the mobile phone 115 may access historical data associated with one or more cells visited previously for providing MBMS and unicast services. The historical data includes MBSFN support, MBSFN area, duplex mode, MBSFN sub-frame configuration, available service information on the one or more cells, or any combination thereof. For instance, if the mobile phone 115 visited the second cell 113 previously, the historical data associated with the second cell 113 may be accessed to provide information for the MBMS and unicast service during mobility between cells. Thereafter, on decoding the SIB2, the mobile phone 115 may receive Multimedia Broadcast Single Frequency Network (MBSFN) configuration for the second cell 113. The mobile phone 115 may apply the MBSFN configuration of the second cell 113 to provide continued Multimedia Broadcast Multicast Service (MBMS) and unicast services. In an embodiment, the second cell 113 is one of a reserved cell or a non-MBMS cell, and is incapable of providing at least one of selected MBMS services. Additionally, the mobile phone 115 may apply the MBSFN configuration of the first cell 111 on previous MBSFN sub-frames, on detecting the mobile phone 115 in the second cell 113. Furthermore, the mobile phone 115 may create autonomous gaps on the previous MBSFN sub-frames based on service information of the first cell 111. The mobile phone 115 may receive the MBMS service on the created autonomous gaps from the first cell 111 in order to maintain the unicast connection on the second cell 113.

In an embodiment, the UE 100 may receive network signaling for priority and critical services to ensure seamless MBMS service continuity. The network signaling may include prior information about service availability and configuration of the second cell 113.

In an embodiment, a UE 115 may detect mobility the first cell 111 to the second cell 113; receive system information based on detecting the mobility; determine a time window based on the system information; perform an RNTI decode during the time window; perform an MBMS decode before and after the time window based on an MBMS configuration received from the first cell 111; and receive a MBSFN configuration for the second cell 113 based on the RNTI decode and the MBMS configuration.

Figure 2A:
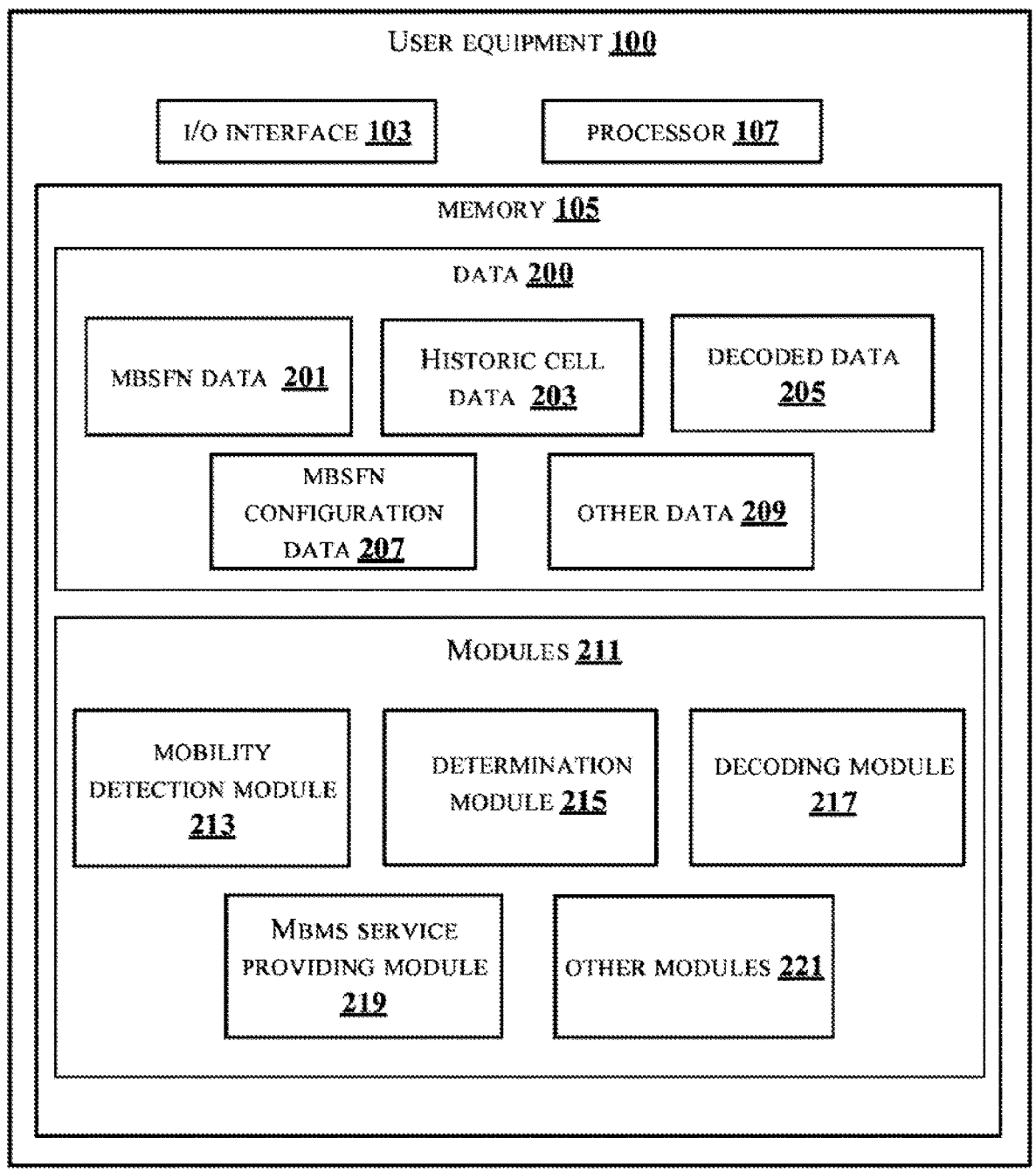
FIG. 2A illustrates a detailed block diagram of a UE in accordance with some embodiments of the present disclosure.

FIG. 2A illustrates a detailed block diagram of a UE 100 in accordance with some embodiments of the present disclosure.

As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality.

The UE 100 may include data 200 and one or more modules 211 which are described herein in detail. The data 200 may include, for example, MBSFN data 201, historic cell data 203, decoded data 205, MBSFN configuration data 207 and other data 209. In an embodiment, data 200 may be stored within the memory 105.

The MBSFN data 201 may include information regarding a Multicast Control Channel (MCCH) and a Multicast Traffic Channel (MTCH). In an embodiment, the MCCH is used to transfer control information. The MCCH carries a single message, the MBSFNAreaConfiguration message, which indicates the MBMS sessions that are ongoing as well as corresponding radio resource configuration. The MTCH is used to transfer MBMS data packets to and from a cell. Typically, user services that include streaming and downloading application services are mapped onto the MTCH. Furthermore, the MBSFN data 201 may include details regarding sub-frames, which can be used for broadcast/multicast purposes.

Figure 2B:
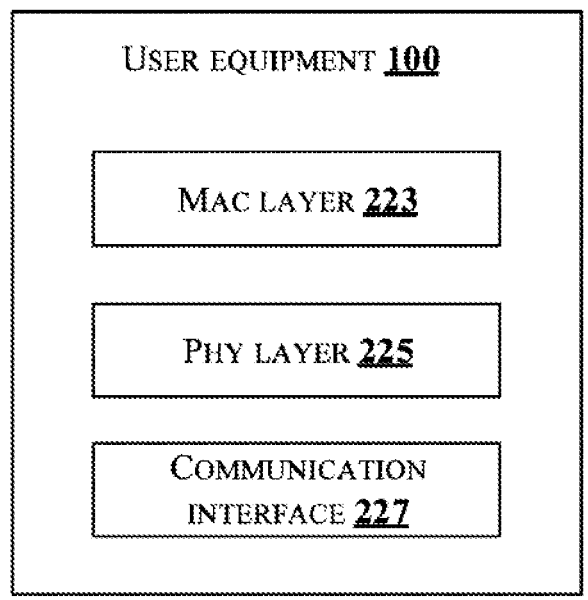
FIG. 2B illustrates exemplary UE layers in accordance with some embodiments of the present disclosure.

The historic cell data 203 may include details regarding the one or more cells visited by the UE 100 previously. In an embodiment, the historical data may include MBSFN support, MBSFN area, duplex mode, sub-frame configuration and available service information about one or more cells The decoded data 205 may include MBSFN service data decoded by utilizing M-RNTI based decode. In an embodiment, the decoded data 205 may be processed at a multiply-accumulate (MAC) layer 223, as shown in FIG. 2B, to segregate different MBMS services the UE 100 may interface with. In an embodiment, decoded data may be discarded if the decoded data is associated with a useless MBMS service. In an embodiment, the decoded data 205 may be utilized by UE 100 for MBMS services like television channels, file downloads, and the like The MBSFN configuration data 207 may include details regarding the MBSFN configuration received for the second cell 113. In an embodiment, the MBSFN configuration of the second cell 113 is applied to the UE 100 to provide continued Multimedia Broadcast Multicast Service (MBMS) and unicast services.

The other data 209 may store data, including temporary data and temporary files, generated by modules 211 for performing the various functions of the UE 100.

In an embodiment, the data 200 in the memory 105 are processed by one or more modules 211 present within the memory 105 of the UE 100. In an embodiment, the one or more modules 211 may be implemented as individually dedicated units. In some implementations, the one or more modules 211 may be communicatively coupled to the processor 107 for performing one or more functions of the UE 100. The said modules 211, when configured with the functionality defined in the present disclosure, will result in a novel hardware In one implementation, the one or more modules 211 may include, but are not limited to a mobility detection module 213, a determination module 215, a decoding module 217 and an MBMS service providing module 219. The one or more modules 211 may also include other modules 221 to perform various miscellaneous functionalities of the UE 100. In an embodiment, the other modules 221 may include a receiving module, a blind decoding module, a parallel decode module, a channel estimating module, autonomous gap generation module and a network signalling module. A receiving module may receive the SIB1 information and the preamble transmission signal from the DCI through the PDCHH upon detection of mobility of the UE 100 to the second cell 113. A blind decoding module may perform a MBSFN decode process on all sub-frames applying MRS based channel estimation and M-RNTI based decode. A parallel decode module may perform decoding process of SIB2/RA R and MBSFN on one or more carriers in the SI time window and the RAR window by reception of SI-RNTI OR RA-RNTI and M-RNTI simultaneously on a same carrier and reception of SI-RNTI and M-RNTI simultaneously on different carriers. A channel estimating module may estimate the Cell-specific Reference Signal (CRS) channel while performing the SI-RNTI decode and the RA-RNTI decode during the SI time window. A network signaling module may increase network signal for priority and critical services to ensure seamless MBMS service continuity. In an embodiment, the network signaling includes prior information about service availability and configuration of the second cell 113

The mobility detection module 213 may detect the mobility of the UE 100 from the first cell 111 to the second cell 113. In an embodiment, the mobility of the UE 100 may be indicated to a physical layer (PHY) layer 225, as shown in FIG. 2B, of the UE 100.

The determination module 215 may determine the SI time window for the UE 100 from the SIB1 information and the RAR window based on the preamble transmission signal associated with the UE 100.

The decoding module 217 may decode one of the SI-RNTI on the SIB2 during an SI time window and the RA-RNTI during a RAR window. In an embodiment, the SIB2 may contain radio resource configuration information that is common among different UE 100. The SIB2 may carry common and shared channel configuration. Furthermore, the decoding module 217 may decode the M-RNTI on the SIB2 before and after the SI time window based on the MBMS configuration received from the first cell 111. In an embodiment, the M-RNTI may be used to inform the UE 100 in RRC_IDLE mode and in RRC_CONNECTED mode about an MCCH information change.

The MBMS service providing module 219 may receive the MBSFN configuration for the second cell 113 after decoding of the SIB2. The MBMS service providing module 219 may apply the MBSFN configuration of the second cell 113 on the UE 100 to provide continued MBMS and unicast services.

FIG. 2B shows an exemplary user equipment layers in accordance with some embodiment of the present disclosure. The UE 100 includes a MAC layer 223, a PHY layer 225 and at least one communication interface 227. In an embodiment, the UE 100 may also include any other layer not mentioned herein explicitly. The communication interface 227 may enable the UE 100 to connect to a network. The communication interface 227 may enable the UE 100 to use the MBMS service, when connected to a network. In an embodiment, the UE 100 may include any other communication interfaces, which may enable the UE 100 to connect to other communication networks. The PHY layer 225 may enable data received via the communication interface 227 to be communicated to the MAC layer 223. The PHY layer 225 may also enable data received from the MAC layer 223 to be communicated over the communication interface 227.

The MAC layer 223 and the PHY layer 225 may communicate using any sort of transport channel.

FIG. 3 illustrates a flowchart showing a method for providing continued MBMS and unicast services across MBMS and non-MBMS regions in accordance with some embodiments of present disclosure.

The method 300 includes one or more blocks for providing continued MBMS and unicast services. The method 300 may be described in the general context of computer executable instructions. Computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method described in FIG. 3. Additionally, individual blocks may be deleted from the method without departing from the scope of the subject matter described herein. Furthermore, the method can be implemented in any suitable hardware, software, firmware, or combination thereof.

At block 301, the mobility of the UE 100 is detected by the mobility detection module 213 from the first cell 111 to the second cell 113. In an embodiment, the detection of the mobility is indicated to the PHY layer 225 of the UE 100.

At block 303, the SIB1 information and the preamble transmission signal is received by the receiving module from the DCI through the PDCHH.

At block 305, the SI time window is determined by the determination module 215 from the SIB1 information and the RAR window based on the preamble transmission signal associated with the UE 100.

At block 307, either the SI-RNTI decode (on the SIB2 during the SI time window) or the RA-RNTI decode (on RAR) is performed by the decoding module 217.

At block 309, the M-RNTI decode is performed by the decoding module 217 before and after at least one of the SI time windows and the RAR window based on the MBMS configuration received from the first cell 111.

At block 311, the MBSFN configuration for the second cell 113 is received by the MBMS service providing module 219 after decoding of the SIB2. In an embodiment, the MBMS configuration of the second cell 113 is applied to the UE 100 to provide continuous MBMS and unicast services.

Figure 4:
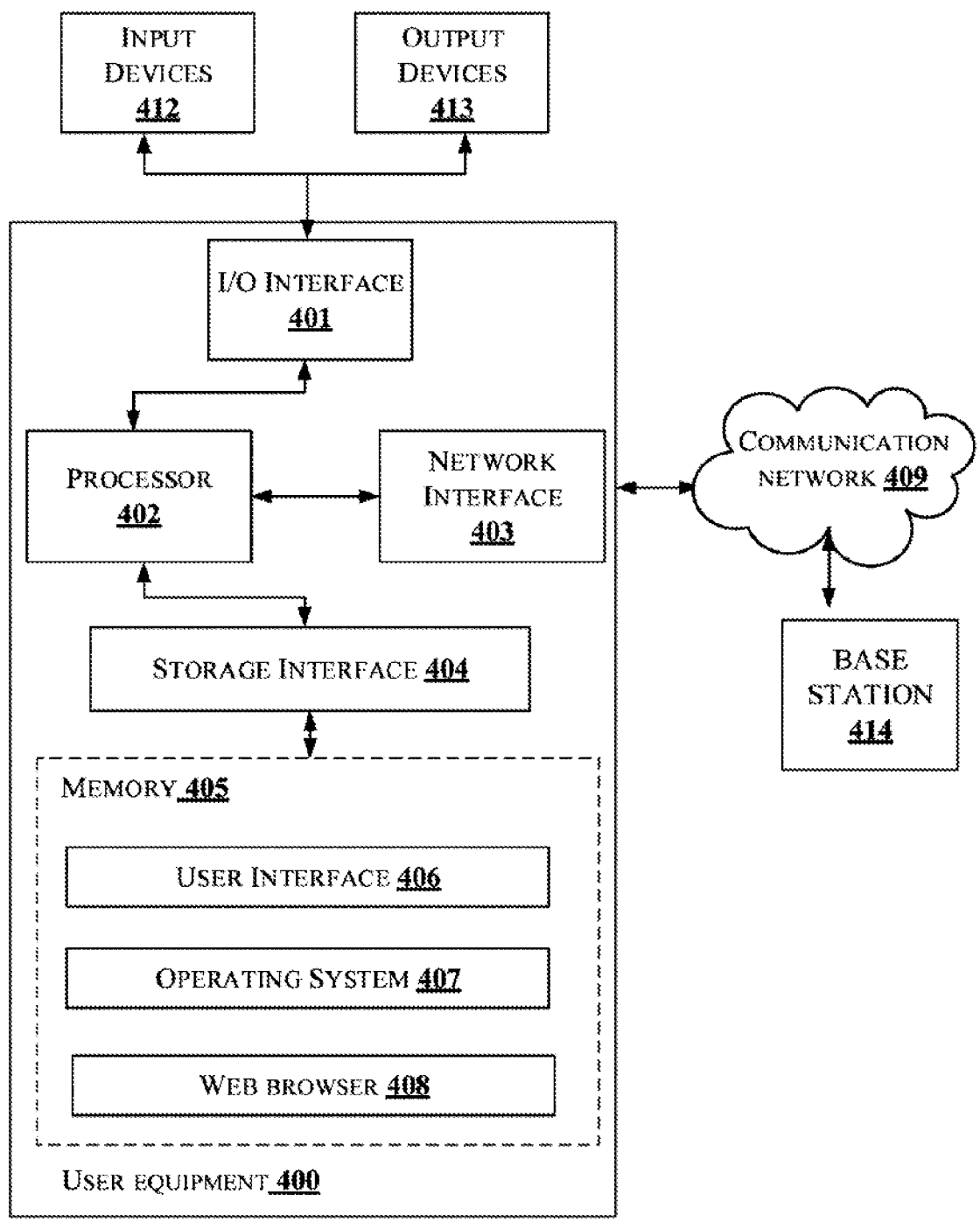
FIG. 4 illustrates a block diagram of an exemplary UE for the implementation of embodiments consistent with the present disclosure.

FIG. 4 illustrates a block diagram of an exemplary user equipment 400 for implementing embodiments consistent with the present disclosure. The user equipment 400 may include a central processing unit processor 402 (also known CPU 402). The processor 402 may include at least one data processor for providing continued Multimedia Broadcast Multicast Service (MBMS) and unicast services across MBMS and non-MBMS regions. The processor 402 may include specialized processing units such as, integrated system (bus) controllers, memory management control units, floating point units, graphics processing units, digital signal processing units, etc.

The processor 402 may be used in communication with one or more I/O devices (not shown) via I/O interface 401. The I/O interface 401 may employ communication protocols/methods such as, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (NDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), 5G, Vehicular communication (V2X), device to device communication network, IOTnetwork, or NB-IOT network; but are not limited as such.

Using the I/O interface 401, the user equipment 400 may communicate with one or more I/O devices. The input device may be an antenna, keyboard, mouse, joystick, (infrared) remote control, camera, card reader, fax machine, dongle, biometric reader, microphone, touch screen, touch-pad, trackball, stylus, scanner, storage device, transceiver, or video device/source; but are not limited as such. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), or audio speaker, but are not limited as such.

The processor 402 may be used in communication with the communication network 409 via a network interface 403. The network interface 403 may communicate with the communication network 409. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 409 may include, without limitation, a direct interconnection, local area network (LAN), wide area network (WAN), wireless network (e.g., using Wireless Application Protocol), the Internet, etc. Using the network interface 403 and the communication network 409, the user equipment 400 may communicate with a base station 414. The network interface 403 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 409 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, LTE network, 5G wireless network, vehicular communication network, IOT network, NB-IOT network, Device to Device communication (D2D) network and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Furthermore, the first network and the second network may include a variety of network devices, including routers, bridges, servers, computing devices, storage devices, etc.

In some embodiments, the processor 402 may be used in communication with a memory 405 (e.g., RAM, ROM, etc. not shown in FIG. 4) via a storage interface 404. The storage interface 404 may connect to memory 405 by means of memory drives or removable disc drives, but are not limited as such. This connection between storage interface 404 and memory 405 employs protocols such as serial advanced technology attachment (SATA), Integrated Drive Electronics (IDE), IEEE-1394, Universal Serial Bus (USB), fiber channel, or Small Computer Systems Interface (SCSI), but are not limited as such. The memory drives may include a drum, magnetic disc drive, magneto-optical drive, optical drive, Redundant Array of Independent Discs (RAID), solid-state memory devices, or solid-state drives, but are not limited as such.

The memory 405 may store a collection of program or database components including user interface 406 or an operating system 407 but are not limited as such. In some embodiments, user device 400 may store user data or application data, such as general data, variables or records, but are not limited as such, as described in this disclosure. Such databases may be implemented as fault-tolerant, relational, scalable, secure databases such as Oracle or Sybase.

The operating system 407 may facilitate resource management and operation of the user equipment 400. Some examples of operating systems include APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XPM, VISTAT™/7/8, 10 etc.), APPLE® IOS™, GOOGLER ANDROID™, BLACKBERRY® OS, or the like, but are not limited as such.

In some embodiments, the user equipment 400 may implement a web browser 408 stored program component. The web browser 408 may be a hypertext viewing application such as MICROSOFT® INTERNET EXPLORER™, GOOGLE® CHROME™, MOZILLA® FIREFOX™, or APPLE® SAFARI™, but are not limited as such. Secure web browsing may be provided using Secure Hypertext Transport Protocol (HTTPS), Secure Sockets Layer (SSL), or Transport Layer Security (TLS), but are not limited as such. Web browsers 408 may utilize facilities such as AJAX™, DHTML™, ADOBE® FLASH™, JAVASCRIPT™, JAVA™, or Application Programming Interfaces (APIs), but are not limited as such. In some embodiments, the user equipment 400 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, or WEBOBJECTS™, but are not limited as such. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like, but are not limited as such. In some embodiments, the user equipment 400 may implement a mail client stored program component. The mail client may be a mail viewing application, such as APPLE® MAIL™, MICROSOFT® ENTOURAGE™, MICROSOFT® OUTLOOK™, or MOZILLA® THUNDERBIRD™, but are not limited as such.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read- Only Memory (ROM), volatile memory, non-volatile memory, hard drives, CI) ROMs, DVDs, flash drives, disks, and any other known physical storage media presently or in the future.

An embodiment of present disclosure provides a seamless user experience by eliminating/reducing MBMS service interruption. In an embodiment of the present disclosure no MBMS loss and/or conflict is encountered during SIB/RAR decode operation. In an embodiment of the present disclosure unicast call/connection is sustained. An embodiment of the present disclosure addresses public safety/critical communications more effectively.

The described operations may be implemented as a method, system, or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor contains at least one microprocessor and a processor capable of processing and executing the queries. A non-transitory computer readable medium may include media such as magnetic storage medium, optical storage, or volatile and non-volatile memory devices, but are not limited as such.

A magnetic storage medium may utilize devices such as hard disk drives, floppy disks, tape, or the like, but are not limited as such. An optical storage device may utilize devices such as CD-ROMs, DVDs, optical disks, or the like, but are not limited as such. Volatile and non-volatile memory devices may utilize devices such as EEPROMs, ROMs, PROMs, RAMs, DRAMs, SRAMs, Flash Memory, firmware, programmable logic, or the like, but are not limited as such Furthermore, non-transitory computer-readable media include all computer-readable media except for a transitory. The code implementing the described operations may further be implemented in hardware logic such as an integrated circuit chip, Programmable Gate Array (PGA), or Application Specific Integrated Circuit (ASIC), but are not limited as such.

Still further, the code implementing the described operations may be implemented in "transmission signals", where transmission signals may propagate through space or through a transmission media, such as, an optical fiber or copper wire, but are not limited as such. The transmission signals in which the code or logic is encoded may further include a wireless signal, satellite transmission, radio waves, infrared signals, or Bluetooth, but are not limited as such. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required or are necessary. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Furthermore, operations described herein may occur sequentially or certain operations may be processed in parallel. Yet furthermore, operations may be performed by a single processing unit or by distributed processing units.

Finally, the language used in the specification has been principally selected for readability and instructional purposes, and the language may or may not have been selected to delineate or circumscribe the inventive subject matter. The language is therefore intended to show that the scope of the invention is not to be limited by this detailed description, but rather by any claims issued on an application based here on. Accordingly, the disclosure of the embodiments of the invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | User equipment |
| 103 | I/O interface |
| 105 | Memory |
| 107 | Processor |
| 109 | MBMS service area |
| 111 | First cell |
| 113 | Second cell |
| 115 | Mobile phone |
| 117 | Base station of first cell |
| 119 | Base station of second cell |
| 200 | Data |
| 201 | MBSFN data |
| 203 | Historic cell data |
| 205 | Decoded data |
| 207 | MBSFN configuration data |
| 209 | Other data |
| 211 | Modules |
| 213 | Mobility detection module |
| 215 | Determination module |
| 217 | Decoding module |
| 219 | MBSFN service providing module |
| 221 | Other modules |

We claim:

1. A method of providing continued Multimedia Broadcast Multicast Service (MBMS) and unicast services across MBMS and non-MBMS regions, the method comprising:
   detecting, by a User Equipment (UE), mobility of the UE from a first cell to a second cell;
   receiving, by the UE, a System Information Block Type 1 (SIB1) information and a preamble transmission signal from a Downlink Control Information (DCI) through a Physical Downlink Control Channel (PDCHH), on detecting the mobility to the second cell;
   determining, by the UE, a System Information (SI) time window from the System Information Block Type 1 (SIB1) information and a Random-Access Response (RAR) window using the preamble transmission signal associated with the UE;
   performing, by the UE, at least one of an SI-Radio Network Temporary Identifier (SI-RNTI) decode on a System Information Block Type 2 (SIB2) during the SI time window and a Random Access (RA-RNTI) decode during the RAR window;
   performing, by the UE, an MBMS-RNTI (M-RNTI) decode before and after at least one of the SI time window and the RAR window based on an MBMS configuration received from the first cell; and
   receiving, by the UE, a Multimedia Broadcast Single Frequency Network (MBSFN) configuration for the second cell after decoding of the SIB2, wherein the MBSFN configuration of the second cell is applied to provide continued Multimedia Broadcast Multicast Service (MBMS) on the first cell and unicast services on the second cell.

2. The method as claimed in claim 1, wherein the detection of the mobility is indicated to a physical layer of the UE.

3. The method as claimed in claim 1, further comprising performing a blind decode by performing an MBSFN decode on all sub-frames in a frame.

4. The method as claimed in claim 1, further comprising performing a parallel decode of the SIB2 and the MBSFN configuration on one or more carriers in the SI time window and the RAR window by:
   reception of SI-RNTI OR RA-RNTI and M-RNTI simultaneously on a same carrier; and
   reception of SI-RNTI OR RA-RNTI and M-RNTI simultaneously on different carriers.

5. The method as claimed in claim 1, further comprising utilizing historical data associated with one or more cells visited by the UE for providing MBMS and unicast services, wherein the historical data comprises MBSFN support, MBSFN area, frequency, duplex mode, sub-frame configuration, available service information on the one or more cells, or any combination thereof.

6. The method as claimed in claim 1, wherein the second cell is one of a reserved cell or a non-MBMS cell, and is incapable of providing at least one of selected MBMS services.

7. The method as claimed in claim 6, further comprising:
   applying, by the UE, the MBSFN configuration of the first cell on previous MBSFN sub-frames, on detecting the UE in the second cell;
   creating, by the UE, autonomous gaps on the previous MBSFN sub-frames based on service information of the first cell;
   receiving, by the UE, the MBMS service on the created autonomous gaps from the first cell; and
   maintaining, by the UE, a unicast connection on the second cell.

8. The method as claimed in claim 1, further comprising estimating a channel based on a Cell-specific Reference Signal (CRS) while performing the SI-RNTI decode during SI time window and the RA-RNTI decode during the RAR window.

9. The method as claimed in claim 1, further comprising estimating a channel based on an MBSFN Reference Signal (MRS) on MBSFN candidate sub-frames.

10. The method as claimed in claim 1, further comprising adding network signaling for priority and critical services to ensure seamless MBMS service continuity, wherein the network signaling comprises prior information about service availability and configuration of the second cell.

11. A User Equipment (UE) for providing continued Multimedia Broadcast Multicast Service (MBMS) and unicast services across MBMS and non-MBMS regions, comprising:
   a processor; and
   a memory communicatively coupled to the processor, wherein the memory stores processor instructions, which, on execution, causes the processor to:
   detect mobility of the User Equipment (UE) from a first cell to a second cell, wherein the detection regarding mobility is indicated to a physical layer of the UE;
   receive a System Information Block Type 1 (SIB1) information and a preamble transmission signal from a Downlink Control Information (DCI) through a Physical Downlink Control Channel (PDCHH), on detecting the mobility to the second cell;
   determine a System Information (SI) time window from the System Information Block Type 1 (SIB1) information and a Random-Access Response (RAR) window based on the preamble transmission signal associated with the UE;
   perform one of an SI-Radio Network Temporary Identifier (RNTI) decode on a System Information Block Type 2 (SIB2) during the SI time window and a Random Access (RA)-RNTI decode during the RAR window;

perform an MBMS-RNTI (M-RNTI) decode before and after at least one of the SI time window and the RAR window based on an MBMS configuration received from the first cell; and receive a Multimedia Broadcast Single Frequency Network (MBSFN) configuration for the second cell after decoding of the SIB2, wherein the MBSFN configuration of the second cell is applied to provide continued Multimedia Broadcast Multicast Service (MBMS) on the first cell and unicast services on the second cell.

12. The UE as claimed in claim 11, wherein the detection of the mobility is indicated to a physical layer of the UE.

13. The UE as claimed in claim 11, wherein the processor performs a blind decode by performing an MBSFN decode on all sub-frames in a frame.

14. The UE as claimed in claim 11, wherein the processor performs parallel decode of the SIB2 and the MBSFN configuration on one or more carriers in the SI time window and the RAR window by:
reception of SI-RNTI or RA-RNTI and M-RNTI simultaneously on a same carrier; and
reception of SI-RNTI or RA-RNTI and M-RNTI simultaneously on different carriers.

15. The UE as claimed in claim 11, wherein the processor utilizes historical data associated with one or more cells visited by the UE for providing MBMS and unicast services, wherein the historical data comprises MBSFN support, MBSFN area, duplex mode, sub-frame configuration, available service information on the one or more cells, or any combination thereof.

16. The UE as claimed in claim 11, wherein the second cell is one of a reserved cell or a non-MBMS cell, and is incapable of providing at least one of selected MBMS services.

17. The UE as claimed in claim 16, wherein the processor:
applies the MBSFN configuration of the first cell on previous MBSFN sub-frames on detecting the UE in the second cell;
creates autonomous gaps on the previous MBSFN sub-frames based on service information of the first cell;
receives MBMS services on the created autonomous gaps from the first cell and maintains a unicast connection on the second cell.

18. The UE as claimed in claim 11, wherein the processor estimates a channel based on a Cell-specific Reference Signal (CRS) while performing the SI-RNTI decode during the SI time window and the RA-RNTI decode during the RAR window.

19. The UE as claimed in claim 11, wherein the processor estimates a channel based on an MBSFN Reference Signal (MRS) on MBSFN candidate sub-frames.

20. A method of communication comprising:
detecting mobility of a UE from a first cell to a second cell;
receiving system information based on detecting the mobility;
determining a time window based on the system information;
performing a Radio Network Temporary Identifier (RNTI) decode during the time window;
performing a Multimedia Broadcast Multicast Service (MBMS) decode before and after the time window based on an MBMS configuration received from the first cell; and
receiving a Multimedia Broadcast Single Frequency Network (MBSFN) configuration for the second cell based on the RNTI decode and the MBMS configuration for the first cell.

* * * * *